United States Patent [19]

Kanazawa et al.

[11] Patent Number: 5,315,689
[45] Date of Patent: May 24, 1994

[54] SPEECH RECOGNITION SYSTEM HAVING WORD-BASED AND PHONEME-BASED RECOGNITION MEANS

[75] Inventors: Hiroshi Kanazawa, Kawasaki; Yoichi Takebayashi, Yokohama, both of Japan

[73] Assignee: Kabushiki Kaisha Toshiba, Kawasaki, Japan

[21] Appl. No.: 996,859

[22] Filed: Dec. 21, 1992

Related U.S. Application Data

[63] Continuation of Ser. No. 701,561, May 13, 1991, abandoned, which is a continuation of Ser. No. 357,715, May 26, 1989, abandoned.

[30] Foreign Application Priority Data

May 27, 1988 [JP] Japan .................................. 63-129919

[51] Int. Cl.$^5$ .............................................. G10L 9/00
[52] U.S. Cl. ..................................... 395/2.47; 395/2.6
[58] Field of Search .................................. 381/41–47; 395/2.47, 2.6

[56] References Cited

U.S. PATENT DOCUMENTS

| | | | |
|---|---|---|---|
| 4,590,605 | 5/1986 | Hataoka et al. | 381/43 |
| 4,618,984 | 10/1986 | Das et al. | 381/43 |
| 4,624,011 | 11/1986 | Watanabe et al. | 381/43 |
| 4,651,289 | 3/1987 | Maeda et al. | 381/43 |
| 4,665,548 | 5/1987 | Kahn | 381/43 |
| 4,723,290 | 1/1988 | Watanabe et al. | 381/43 |
| 4,769,844 | 9/1988 | Fujimoto et al. | 381/42 |
| 4,918,732 | 4/1990 | Gerson et al. | 381/46 |
| 4,926,488 | 5/1990 | Nadas et al. | 381/46 |
| 4,972,485 | 11/1990 | Dautrich et al. | 381/43 |
| 4,975,959 | 12/1990 | Benbassat | 381/43 |

FOREIGN PATENT DOCUMENTS 0200347 5/1986 European Pat. Off. .............. 381/43

OTHER PUBLICATIONS

Review of the Electrical Communications Laboratories, vol. 34, No. 3, May 1986, pp. 327–333, The Research and Development Headquarters, Nippon Telegraph and Telephone Corp., Tokyo JP; N. Sugamura et al.: "Speaker-dependent large vocabulary word recognition using the SPLIT method".

ICASSP'86-IEEE-IECEJ-ASJ International Conference on Acoustics, Speech, and Signal Processing, Tokyo, Apr. 7–11, 1986, vol. 4, pp. 2651–2654, IEEE, New York, US; Y. Niimi et al.: "Synthesis of speaker-adaptive word templates by concatenation of the monosyllabic sounds".

Yoichi Takebayshi et al, "Telephone Speech Recognition Using a Hybrid Method", ICPR (International Conference of Pattern Recognition, Dec., (1989), pp. 1232–1235.

Primary Examiner—Michael R. Fleming
Assistant Examiner—Michelle Doerrler
Attorney, Agent, or Firm—Oblon, Spivak, McClelland, Maier & Neustadt

[57] ABSTRACT

A speech recognition system includes a parameter extracting section for extracting a speech parameter of input speech, a first recognizing section for performing recognition processing by word-based matching, and a second recognizing section for performing word recognition by matching in units of word constituent elements. The first word recognizing section segments the speech parameter in units of words to extract a word speech pattern and performs word recognition by matching the word speech pattern with a predetermined word reference pattern. The second word recognizing section performs recognition in units of word constituent elements by using the extracted speech parameter and performs word recognition on the basis of candidates of an obtained word constituent element series. The speech recognition system further includes a recognition result output section for obtaining a recognition result on the basis of the word recognition results obtained by the first and second recognizing sections and outputting the obtained recognition result. The speech recognition system further includes a word reference pattern learning section for performing learning of a word reference pattern on the basis of the recognition result obtained by the recognizing result output section and the word speech pattern.

20 Claims, 7 Drawing Sheets

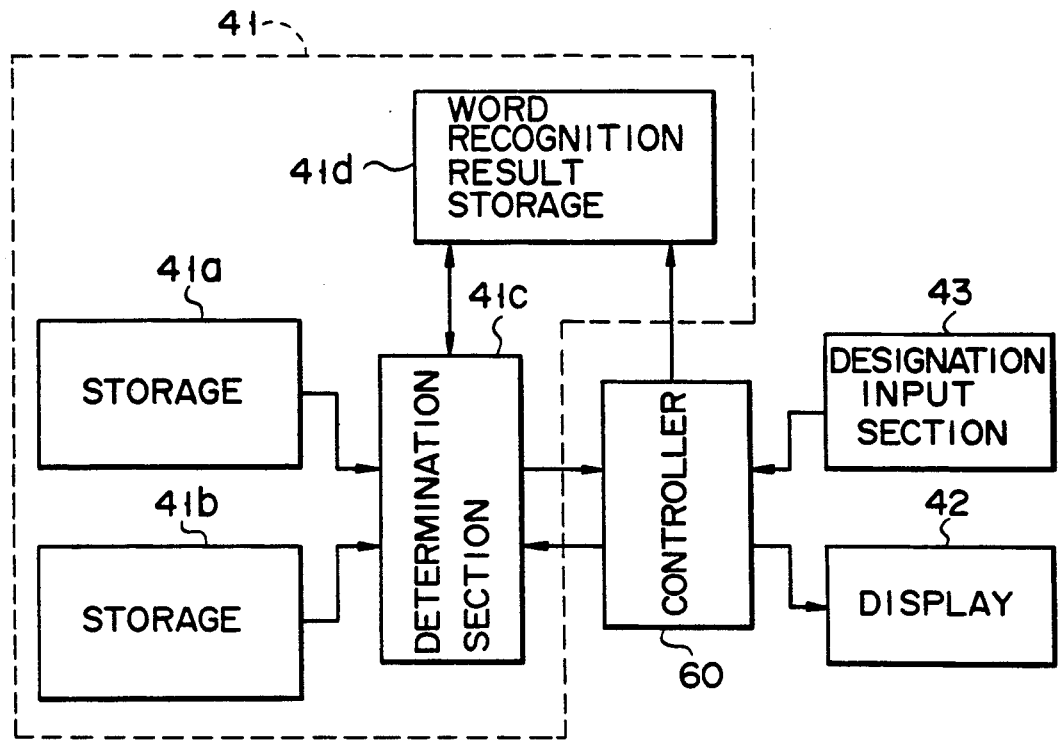
F I G. 2
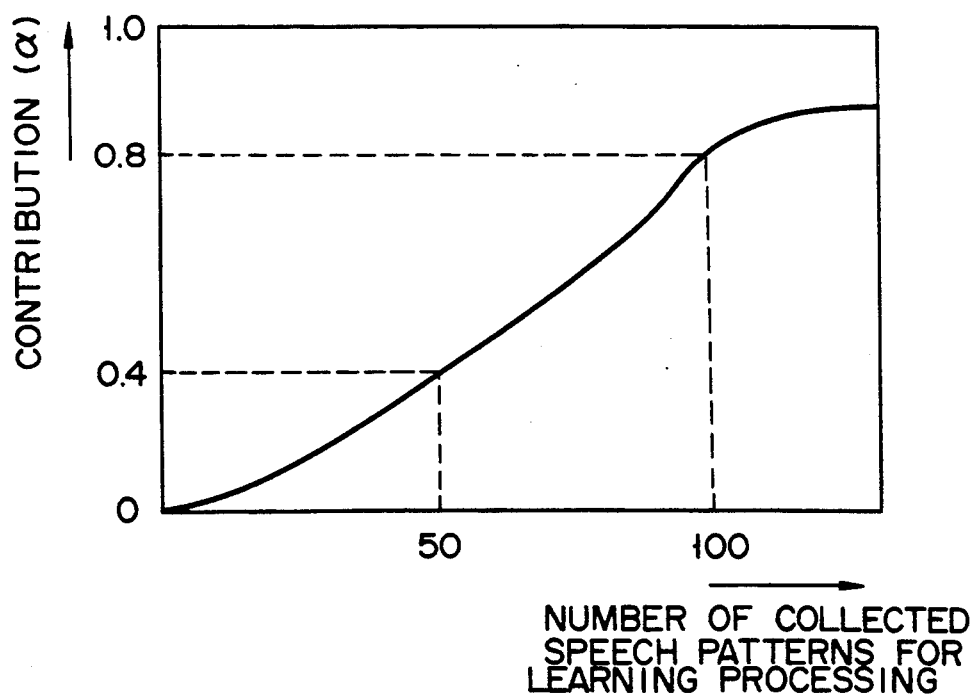
F I G. 6

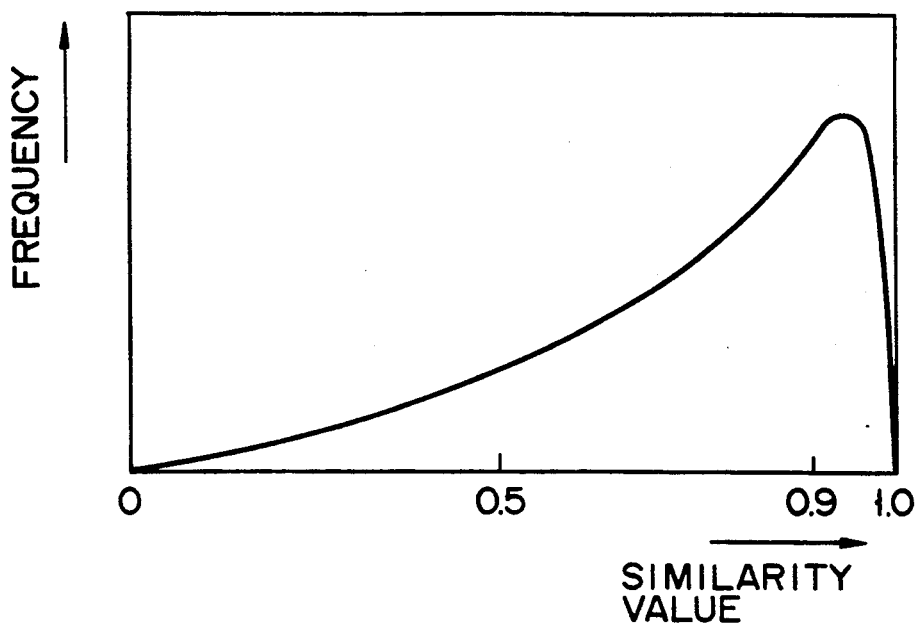
F I G. 4
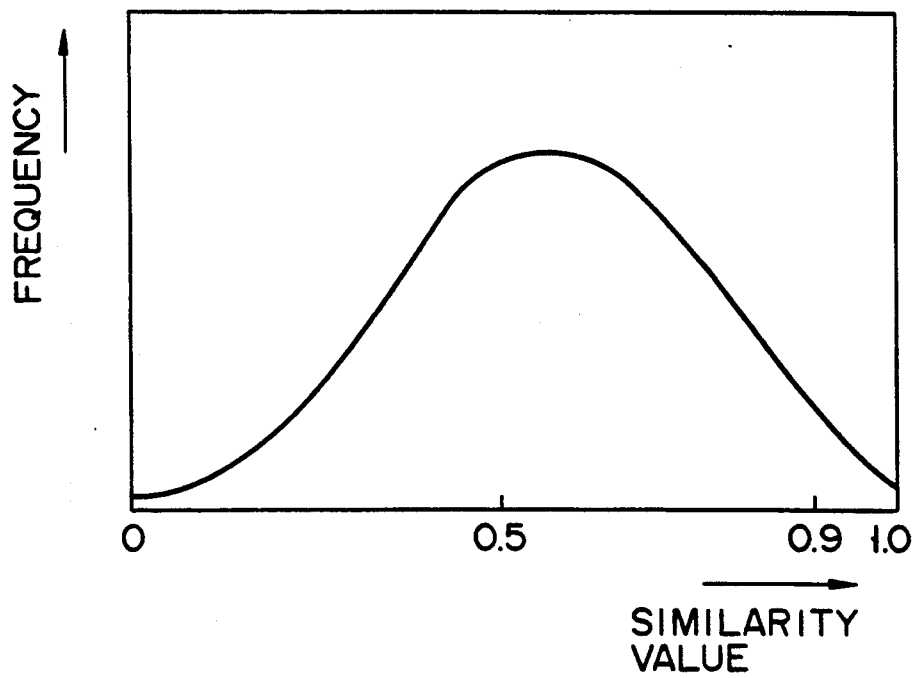
F I G. 5

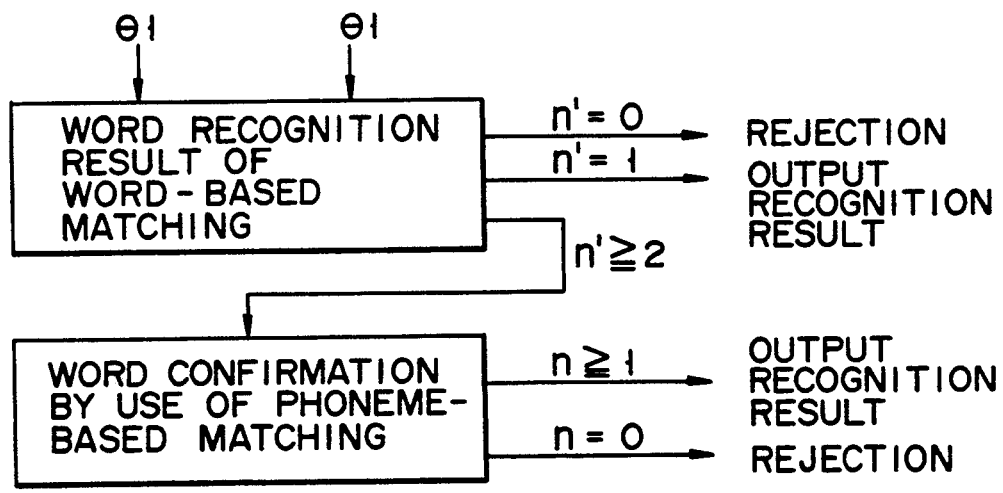
F I G. 10
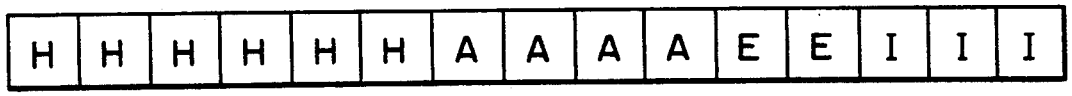
F I G. 11
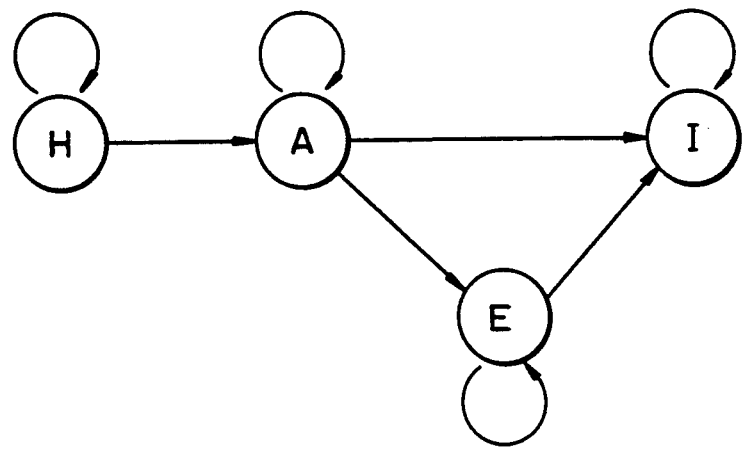
F I G. 12

SPEECH RECOGNITION SYSTEM HAVING WORD-BASED AND PHONEME-BASED RECOGNITION MEANS

This application is a continuation of application Ser. No. 07/701,561, filed on May 13, 1991, now abandoned, which was a continuation of application Ser. No. 07/357,715, filed on May 26, 1989, now abandoned.

BACKGROUND OF THE INVENTION

1. Field of the Invention

The present invention relates to a speech recognition system including a first word recognizing section based on matching in units of words and a second word recognizing section based on matching in units of word constituent elements.

2. Description of the Related Art

The following two methods have been conventionally known as standard methods of word recognition. The first word recognition method is based on matching in units of words, i.e., word-based matching. In this method, input speech is extracted in units of words, and word recognition is performed by word pattern matching of the entire words. The second word recognition method is based on matching in units of word constituent elements. In this method, input speech is segmented in units of word constituent elements such as phonemes or syllables, and phoneme or syllable recognition is performed by pattern matching in units of the word constituent elements, thereby recognizing a word input speech from a series of the recognized word constituent element candidates.

In the former system, since matching of entire words is performed, input speech need not be decomposed into smaller recognition units as in the latter method. Hence, the former recognition method is simple. In addition, since matching of entire words is based on dynamic time-frequency spectral information of utterance, the recognition accuracy is generally high. On the other hand, in the former system, when the number of words to be recognized is increased, registration of the reference patterns for all the words becomes difficult, and hence the recognizable vocabulary size is undesirably limited. Furthermore, since learning of reference patterns requires a large amount of word speech patterns, the vocabulary cannot be easily changed or increased.

In contrast to this, in the latter system, since the number of phonemes or syllables is much smaller than that of words, the number of types of reference patterns to be prepared is at most a hundred. In addition, the vocabulary can be changed by a simple method of, e.g., entering a character string. In this method, however, recognition processing consists of the following steps, e.g., segmentation, labelling (phoneme or syllable recognition) and word recognition, and hence the processing is complex. In addition, errors in segmentation, in conversion of a pattern into a phoneme or syllable series, or in estimation of a word from the phoneme or syllable series degrade the recognition rate.

In addition to the above-described two methods, a method of performing word recognition by using both pattern matching of entire words and a network of a series of labels attached to the respective frames of a speech pattern has been proposed (Proc. Seventh ICPR pp. 1232–1235, 1984). The above-described problems of difficulties encountered in registration of reference patterns and expansion of a vocabulary still remain unsolved in this method.

As described above, in the conventional speech recognition systems, if the word recognition method based on matching in units of words is used, registration of reference patterns or expansion of a vocabulary is laborious. If the word recognition method based on matching in units of word constituent elements is used, a processing amount is greatly increased, and a recognition error tends to occur.

SUMMARY OF THE INVENTION

It is an object of the present invention to provide a speech recognition system, in which registration of reference patterns of words need not be performed in advance and learning of word reference patterns can be efficiently performed as the recognition system is used in real-world application, and which can greatly reduce a user's operation load.

It is another object of the present invention to provide a speech recognition system which can perform better recognition processing as more learning of reference patterns by using the speech data collected during recognition processing is executed, thereby obtaining high recognition rate.

A speech recognition system according to the present invention comprises two word recognizing sections, i.e., a first word recognizing section for extracting a speech parameter of input speech by using a speech parameter extracting section and performing recognition processing with respect to the word speech pattern by word-based matching, and a second word recognizing section for performing word recognition by matching in units of word constituent elements which are smaller than words as units. The first word recognizing section segments the extracted speech parameter in units of words to extract a word speech pattern, and performs word recognition by matching the word speech pattern with a predetermined word reference pattern. The second word recognizing section performs recognition in units of word constituent elements by using the extracted speech parameter, and performs word recognition on the basis of candidates of an obtained word constituent element series. In this case, the word constituent elements mean recognition units which are smaller than words as units, such as phonemes, syllables, CVC (C: consonant, V: vowel), and VCV. In addition, the speech recognition system comprises a total decision section for synthetically obtaining a recognition result on the basis of the word recognition results from the first and second word recognizing sections and outputting the obtained total decision result. The system further comprises a word reference pattern-learning section for performing learning processing of a word reference pattern on the basis of the recognition result obtained by the recognition result output section and word speech patterns extracted in the course of the recognition processing.

In the above-described aspects of the present invention, the recognition result output section may comprise a display section for displaying a recognition result and a designation input section for externally designating "correct" or "incorrect" with respect to the recognition result, so that the word reference pattern-learning section performs learning on the basis of an input from the designation input section.

According to the speech recognition system of the present invention, the system comprises the word recognizing sections using the two types of matching, i.e., matching in units of words and in units of word constituent elements. Therefore, even if no word reference pattern for word-based matching is registered, a word recognition result can be obtained by recognition processing by matching in units of word constituent elements. The word reference pattern-learning section for the word-based matching performs learning of a word reference pattern on the basis of a word recognition result by the matching in units of word constituent elements and word speech patterns. Therefore, in the system of the present invention, word reference patterns need not be registered in advance, and word recognition by matching in units of word constituent elements can be performed at first without any word speech patterns. The contents of word reference patterns can be gradually improved through this speech pattern collection and learning processing in the practical application of the recognition system.

Word reference pattern learning may be performed by using batch speech patterns which have been subjected to recognition processing based on, e.g., a recognition result and information of "correct" or "incorrect, designated by a user.

If word reference patterns are generated in this manner, both word recognition by matching in units of word constituent elements and word recognition by matching in units of words can be used, and a high recognition rate can be expected.

In addition, if word reference patterns are repeatedly learned by using the collected speech patterns during use of the recognition system by users, the performance of word recognition by word-based matching can be improved. Therefore, in the total decision section, determination in which greater importance is given to word recognition by word-based matching is performed to obtain higher recognition performance.

According to the speech recognition system of the present invention, since a final recognition result is obtained by totally determining word recognition results obtained by word- and phoneme-based matching, and word reference pattern learning is performed on the basis of the final recognition result, learning of a word reference pattern can be performed in the course of applying the recognition system which collects the speech patterns and recognizes a spoken word in parallel. Therefore, word reference patterns need not be registered in advance, and a vocabulary can be easily increased. In addition, with the progress of recognition processing, the contents of word reference patterns are improved, and the recognition rate is gradually increased.

BRIEF DESCRIPTION OF THE DRAWINGS

FIG. 2 is a block diagram showing a recognition result output section in the system in FIG. 1 in more detail;

FIG. 4 is a graph, showing a similarity distribution obtained by word-based matching, for explaining a system according to a second embodiment of the present invention;

FIG. 5 is a graph, showing a similarity distribution obtained by phoneme-based matching, for explaining the system according to the second embodiment of the present invention;

FIG. 6 is a graph, in which the relationships between the number of learning speech patterns and the contributions of recognition by word-based matching to total decision are shown for explaining the system according to the second embodiment of the present invention;

FIGS. 8 to 10 are views illustrating the flows of processing in the system according to the third embodiment of the present invention; and FIGS. 11 and 12 are views respectively illustrating a phoneme label series and a transition network of phoneme labels used in the processing in the system according to the third embodiment of the present invenion.

DETAILED DESCRIPTION OF THE PREFERRED EMBODIMENTS

Embodiments of a speech recognition system of the present invention will be described below.

First Embodiment

Figure 1:
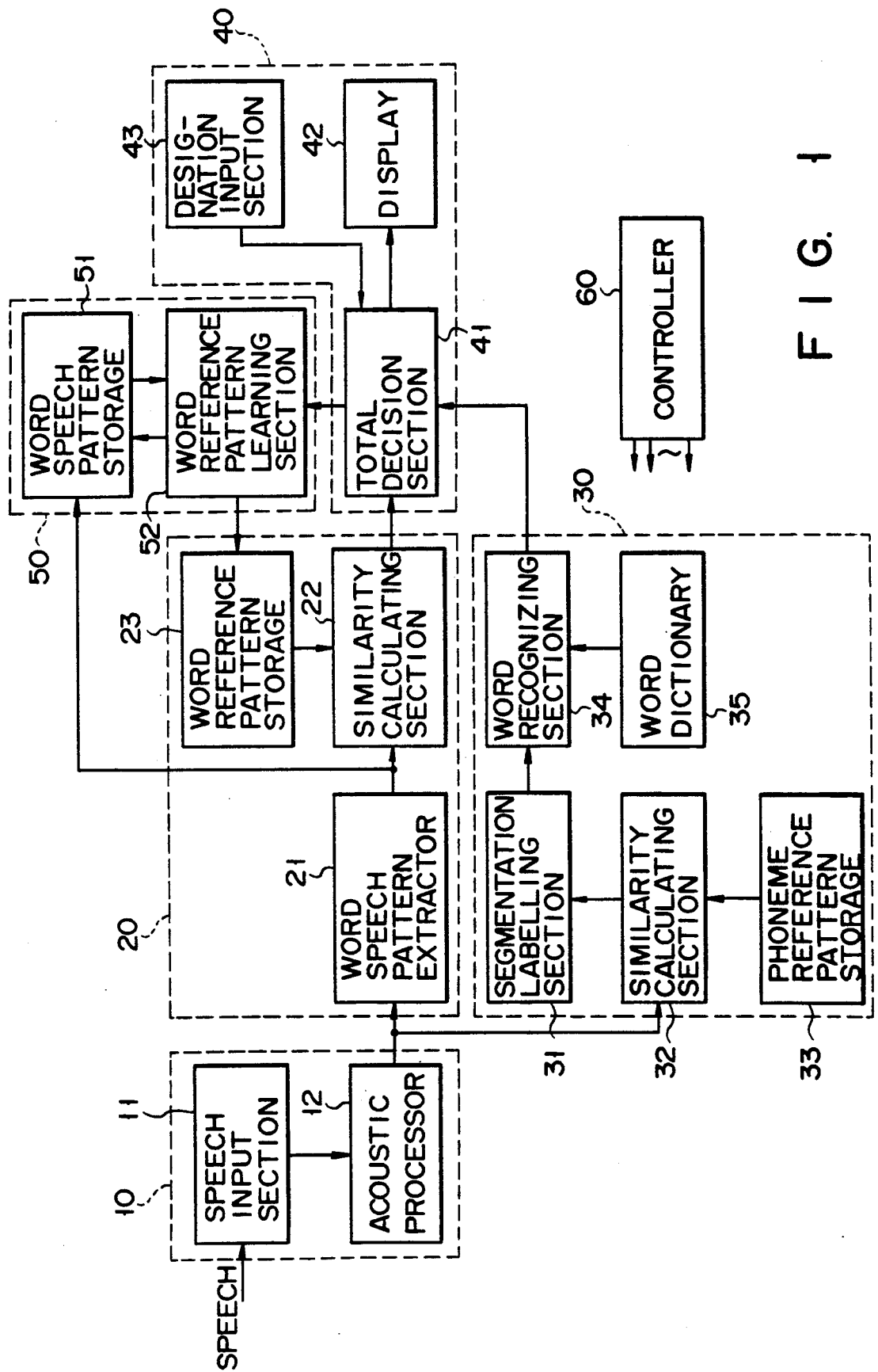
FIG. 1 is a block diagram showing an arrangement of a speech recognition system according to a first embodiment of the present invention.

As shown in FIG. 1, a speech recognition system according to a first embodiment of the present invention comprises a speech parameter extractor 10, a first word recognizing section 20 for performing word recognition by word-based matching, a second word recognizing section 30 for performing word recognition by phoneme-based matching, a recognition result output section 40 for outputting a recognition result, and a word reference pattern learning section 50 for learning a word reference pattern for word-based matching. A speech parameter extracted by the speech parameter extractor 10 is subjected to word recognition processing in both the first word recognizing section 20 using word-based matching and the second word recognizing section 30 using phoneme-based matching. The respective results are totally determined by the recognition result output section 40, and learning of a word reference pattern is performed in the word reference pattern-learning section 50.

The speech parameter extractor 10 comprises a speech input section 11 and an acoustic processor 12. The speech input section 11 converts input speech into an electrical signal by using, e.g., a microphone. The acoustic processor 12 is constituted by, e.g., an 8-channel filter bank. The processor 12 performs spectral analysis of a speech signal supplied through the speech input section 11 at a frame period of, e.g., about 20 ms. Processor 12 converts the speech signal into a power spectrum and decreases the number of dimensions, thereby outputting the resultant value as a speech parameter. As a speech parameter, in addition to the resultant value of the above filter analysis, an analysis result by, e.g., Fast Fourier Transformation (FFT) or cepstrum analysis may be used.

The first word recognizing section 20 for performing word-based matching comprises a word speech pattern extractor 21, a similarity calculating section 22, and a word reference pattern storage 23. The word speech pattern extractor 21 detects, from a speech parameter output by the acoustic processor 12, e.g., points at which a speech power is lowered as start and end points of a word, and uniformly resamples a predetermined number of speech parameters within an interval between the start and end points in the time base direction so as to obtain a word speech pattern (word feature vector) thereby outputting it as a word speech pattern. In the word reference pattern storage 23, the reference pattern of a category l (word) to be recognized is registered. In the case where recognition is based on, e.g., the multiple similarity measure, an eigenvalue $\lambda n^{(l)}$ (n=1−N) and an eigenvector $\phi n^{(l)}$ (n=1−N) obtained from a large amount of sample data through a convariance matrix, are stored as reference patterns. The similarity calculating section 22 obtains similarities $S^{(l)}[f]$ between a word speech pattern $\{f\}$ extracted by the word speech pattern extractor 21 and reference pattern vectors $\{\phi n^{(l)}\}$ of the category stored in the word reference pattern storage 23 in accordance with the following multiple similarity calculation:

$$S^{(l)}[f] = \sum_{n=1}^{N} \frac{\lambda n^{(l)}(\phi n^{(l)})^2}{\lambda^{(l)}||f||^2}$$

The similarity calculating section 22 outputs word categories and their similarity value. Note that a Mahalanobis' distance or Euclidean distance may be utilized instead of such multiple similarity values.

The second word recognizing section 30 for performing phoneme-based matching comprises a segmentation and labelling section 31, a similarity calculating section 32, a phoneme reference pattern storage 33, a word recognizing section 34, and a word dictionary 35. The similarity calculating section 32 receives a speech parameter output from the acoustic processor 12. The similarity calculating section 32 performs a similarity calculation by using a speech parameter and a reference pattern stored in the phoneme reference pattern storage 33, and obtains similarities like the above-described multiple similarities for, e.g., each frame. The segmentation and labelling section 31 performs segmentation on the basis of the obtained similarity series and the speech parameters, and at the same time, performs phoneme recognition (labelling) in the corresponding interval. The word recognizing section 34 receives phoneme series candidates obtained by the section 31 and performs a similarity calculation in accordance with, e.g., DP matching, thereby outputting word recognition candidates to the recognition result output section 40.

The recognition result output section 40 comprises a total decision section 41, a display 42, and a designation input section 43. The total decision section 41 outputs a final word recognition result based on recognition results from the word recognizing section 20 of word-based matching and the word recognizing section 30 of phoneme-based matching. The display 42 is constituted by, e.g., a CRT display. The designation input section 43 is used by a user to enter, e.g., "correct" or "incorrect" with respect to a recognition result displayed on the display 42, or is used to enter a correct category name when a result is incorrect.

The word reference pattern learning section 50 for word recognition comprises a word speech pattern storage 51 and a word reference pattern learning section 52. The storage 51 stores word speech pattern extracted by the word speech pattern extractor 21. The section 52 performs learning of the word reference pattern by using word speech patterns stored in the storage 51, and information of "correct" or incorrect" which are input by the designation input section 43 and a recognition result stored in the total decision section 41 in accordance with the word speech pattern.

An operation of the speech recognition system thus arranged according to the embodiment will be described below.

An utterance made by a user is converted into an electrical signal by the speech input section 11, and is then converted into a speech parameter constituted by spectrum data by the acoustic processor 12. This speech parameter is supplied to the first (word-based) word recognizing section 20 and the second (phoneme-based) word recognizing section 30. In the first word recognizing section 20, if sufficient reference patterns are registered in the word reference pattern storage 23, word-based recognition processing is not performed but only extraction of a word speech pattern by the word speech pattern extractor 21 is performed. If a reference pattern is present in the storage 23, matching of the reference pattern registered therein and a word speech pattern extracted by the extractor 21 is performed, and a similarity with respect to a word to be recognized is output. The extracted word speech pattern is stored in the word speech pattern storage 51 and will be used in learning to be described later.

In the second word recognizing section 30, similarity calculating section 32 receives a speech pattern from the acoustic processor 12, and performs a similarity calculation by using a phoneme reference pattern. The segmentation and labelling section 31 performs segmentation on the basis of the obtained similarity series and the speech patterns, and at the same time, performs phoneme recognition. The word recognizing section 34 receives phoneme series candidates obtained by the section 31 and performs a similarity calculation in accordance with, e.g., DP matching, thereby outputting word recognition candidates to the recognition result output section 40.

The word recognition results obtained by the word recognizing section 20 of word-based matching and the word recognizing section 30 of phoneme-based matching are input to the total decision section 41, and are output on the display 42 as a final word recognition result.

When the user enters an input "correct" or "incorrect" with respect to the recognition result output on the display 42 through the designation input section 43, or enters a correct category name through the section 43, these input speech data and recognition result are stored in the word recognition result storage of the total decision section 41 in accordance with the word speech pattern stored in the word speech pattern storage 51. With this operation, while normal recognition processing is performed, word speech pattern acquisition for word reference pattern learning can be performed by user's designation inputs.

Learning of word reference patterns is performed in the following manner.

For example, word reference patterns based on the above-described multiple similarity method will be exemplified. A covariance matrix $K$ is prepared by using feature vectors $X n$ (n=1, 2, ..., N) belonging to a corresponding category stored in the word feature vector storage 51 as follows:

$$K^{(l)} = \sum_{n=1}^{N} X^{(l)} X^{(l)t}$$

(t: transposition, l: category,
N: number of word speech patterns)

The covariance matrix $K^{(l)}$ thus obtained is subjected to main component analysis to obtain an eigenvalue $\lambda^{(l)}$ and an eigenvector $O^{(l)}$. A reference pattern for word recognition may be prepared by forming the above covariance matrix when the number of word speech patterns belonging to a given category exceeds a predetermined number.

Moreover, the covariance matrix $K^{(l)}$ upon formation of the word reference pattern of the given category is stored in the word speech pattern storage 51 and may be used as a basic covariance matrix for the next learning procedure as follows:

$$K^{(l)'} = K^{(l)} + \alpha \sum_{n=1}^{N} X_{n^{(l)}} X_{n^{(l)t}}$$

$^{(l)}$: basic covariance matrix
$^{(l)'}$: new covariance matrix
$n^{(l)}$: word speech patterns for learning processing
l: category
$\alpha$: coefficient
N: number of word speech patterns for learning processing
t: transposition Word reference patterns can be generated by learning in the word reference pattern learning section 52 by performing word speech pattern acquisition for the formation of the word reference patterns while operating the recognition system in the application processing in the above-described manner. Therefore, without pre-registering reference patterns in the word reference pattern storage 23, word recognition is performed in such a manner that word recognition processing is only performed by word recognition of phoneme-based matching at first, and total decision mainly based on word recognition of word-based matching is performed in the total decision section 41 as the amount of data used for learning of word reference patterns is increased. This is because the recognition performance in units of words is improved upon the learning of word reference patterns.

With the above-described processing, the final result obtained by the total decision section 41 is output on the display 42.

Figure 3:
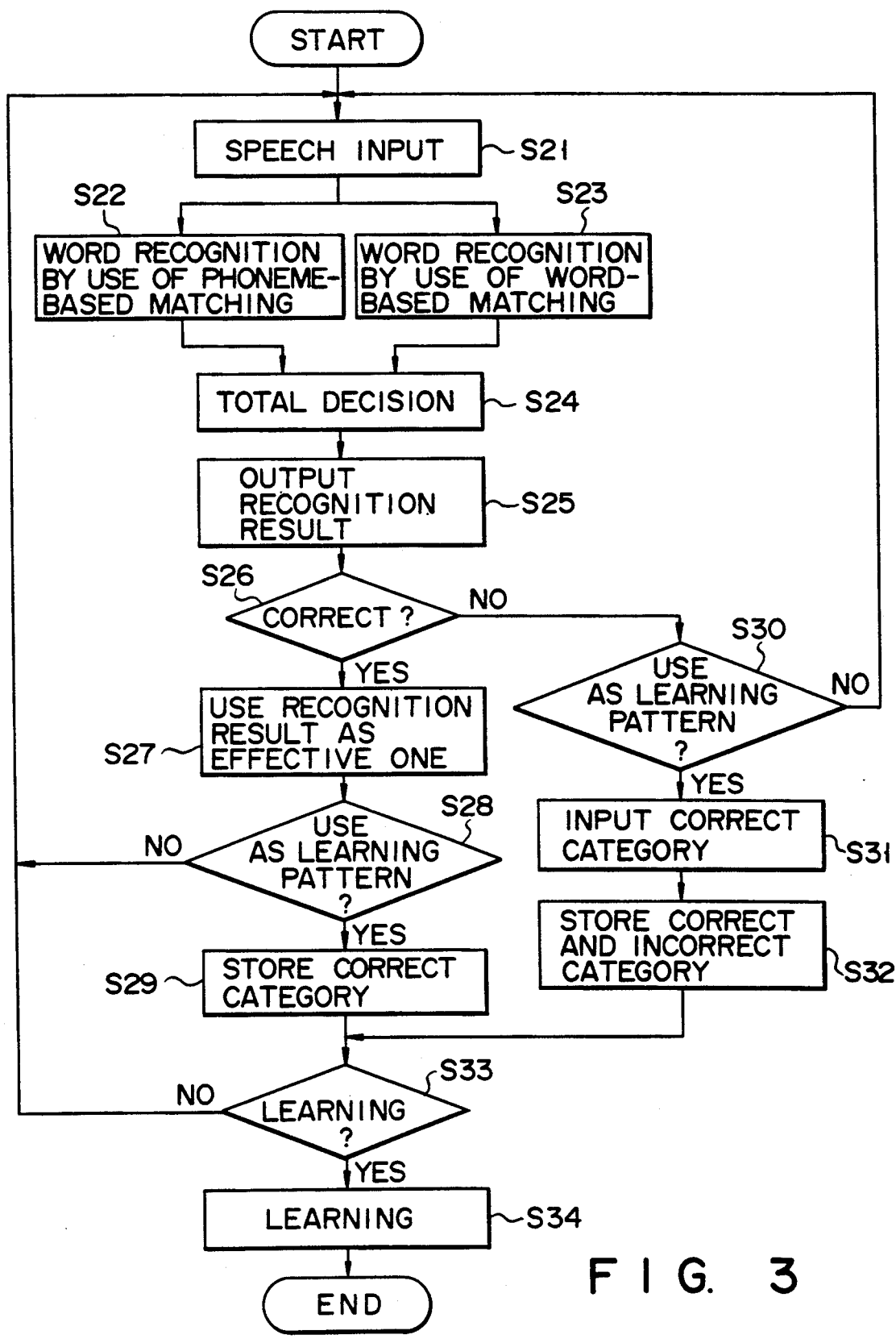
FIG. 3 is a flow chart showing learning processing of a word reference pattern in the system in FIG. 1.

More specifically, assume that the total decision section 41 comprises a word recognition result storage 41a of word-based matching, a word recognition result storage 41b of phoneme-based matching, a determination section 41c, and a recognized word storage 41d, as shown in FIG. 2. In this case, learning may be performed in accordance with a flow chart shown in FIG. 3.

Input speech is obtained (S21), and results obtained by word recognition by use of word-based matching (S23) are stored in the storage 41a and results obtained by word recognition of phoneme-based matching (S22) are stored in the storage 41b. The stored recognition results are supplied to the determination section 41c to be total decision on the basis of a predetermined determination rule, thereby a recognition result is obtained (S24). This recognition result is output on the display 42 through a controller 60 (S25). If "correct" is input by the user with respect to the recognition result (S26), the result is used as an effective one (S27). If it is designated that the word speech pattern (feature vector) is used as a learning pattern (S28), a correct category name is stored in the storage 41d in accordance with the word speech pattern (feature vector). If it is not used as a learning pattern, the next input is designated (S21). In addition, if "incorrect" is input by the user, it is checked whether the result is to be used as a learning pattern (S30). If it is not used as a learning pattern in this step, the next speech input is designated (S21). If it is used as a learning pattern, a correct category name is input by the user (S31). Thereafter, the incorrect and correct category names are stored in the storage 41d in correspondence with each other and with the word speech pattern (feature vector) (S32). When the above-described processing is completed, a designation whether to perform learning is input (S33). If no learning is to be performed, the next speech input is designated (S21). If it is designated that learning is to be performed, learning is performed on the basis of word speech patterns accumulated in the word speech pattern storage 51 and the recognition result stored in the storage 41d (S34).

Collection of word speech patterns (feature vectors) for learning processing can be performed in the flow of normal recognition processing by providing simple designations in this manner. Therefore, the system of the present invention is completely free from the cumbersome procedure of registering reference patterns by uttering words to be recognized one by one as in the conventional system, and hence change of a vocabulary can be greatly facilitated.

In addition, learning sections for the two word recognizing sections 20 and 30 are arranged. Thus, while learning is performed in the above manner, speaker independent recognition is performed at first, and this adaptively results in speaker dependent recognition with progress in the learning of the word reference pattern of the word recognizing section 20 of word-based matching and of the phoneme reference pattern of the word recognizing section 30 of phoneme-based matching, thereby improving the recognition accuracy.

In the above-described embodiment, the user provides a designation of "correct" or "incorrect" in collecting of speech pattern for learning processing. However, only data based on a recognition result which is determined to be sufficiently reliable may be automatically supplied to the word reference pattern learning section 52, thereby performing a learning operation. Furthermore, in the above-described embodiment, recognition of word consitutent-based matching using a phoneme as a word constituent element is described. However, word recognition based on elements other than phonemes, e.g., syllables, CVC, and VCV may be performed.

Second Embodiment

As described above, as the amount of data used in learning of a word reference pattern is increased, the recognition performance based on word-based matching is improved. In order to enable high-precision recognition, with a progress in learning of a word reference pattern using acquired word speech pattern, a greater importance is given to a recognition result based on word-based matching which is increased in performance than to a recognition result based on phoneme-based matching in the total decision section 41. A second embodiment of the present invention wherein such processing in the total decision section 41 is exemplified will be described in detail below.

The total decision section 41 determines a final recognition result by using similarities obtained by word- and phoneme-based matching.

Assume that similarity values in recognition by use of word-based matching exhibit a distribution shown in, e.g., FIG. 4, and similarities in recognition by use of phoneme-based matching exhibit a distribution shown in, e.g., FIG. 5. If the similarity values of a given category with respect to input speech become the same value (e.g., 0.9) in word- and phoneme-based matching, the probability that the input speech belongs to the category is higher in word recognition of phoneme-based matching than in word recognition of word-based matching. For this reason, similarity values output from the first word recognizing section 20 of word-based matching and from the second word recognizing section 30 of phoneme-based matching are converted into posterior probabilities (cf. Proc. ICASSP pp. 1077–1080, 1986), so that the similarity values output from the recognizing sections 20 and 30 are converted into similarity values which can be commonly processed. In this case, if the converted similarity values based on word recognition of word- and phoneme-based matching are respectively set to be $P1^{(l)}$ (l is a category) and $P2^{(l)}$, a final similarity value $S^{(l)}$ of the category l is given as:

$$S^{(l)} = \alpha^{(l)} P1^{(l)} + (1 - \alpha^{(l)}) P2^{(l)}$$

where $\alpha^{(l)}$ is a parameter representing a contribution to total decision of word recognition by word-based matching with respect to the category l. In this case, $0 \leq \alpha < 1$. The value of $\alpha$ is changed depending on the number of word speech patterns used in learning of a word reference pattern. For example, as shown in FIG. 6, with an increase in the amount of word speech patterns for learning, the value of $\alpha$ is monotonously increased so as to add a greater importance to recognition by word-based matching in the total decision section.

In this case, when the number of word speech patterns for learning of a given category l corresponds to 50, the contribution $\alpha^{(l)}$ of word recognition by word-based matching used in the total decision section is set to be 0.4. When the number of word speech patterns corresponds to 100, the contribution $\alpha^{(l)}$ is set to be 0.8.

Although the change of the above contribution is not limited to the example shown in FIG. 6, $\alpha$ tends to be increased with an increase of the number of word speech patterns used for learning of a word reference pattern. A result obtained by the above recognition processing for the input speech is output to the user. The user inputs "correct" or "incorrect" with respect to the output category. If "correct" is designated, learning of the word reference pattern of the correct category is performed by using the word speech pattern obtained by the input speech. Since the number of word speech patterns for learning of a word reference pattern varies in each category, the contribution $\alpha$ to total decision of recognition of word-based matching varies in each category.

In control for learning, for example, word speech patterns for learning may be acquired in accordance with a designation from the user and learning processing may be performed with respect to a category for which, for example, 10 word speech patterns for learning are accumulated (not performed until 10 word speech patterns for learning accumulated).

Third Embodiment

A third embodiment of the present invention will be described below as another example of processing in the total decision section 41 wherein, similar to the second embodiment, with a progress in learning of a word reference pattern by using acquired word speech patterns, a greater importance is given to a recognition result based on improved word-based matching than to a recognition result based on phoneme-based matching.

Figure 7:
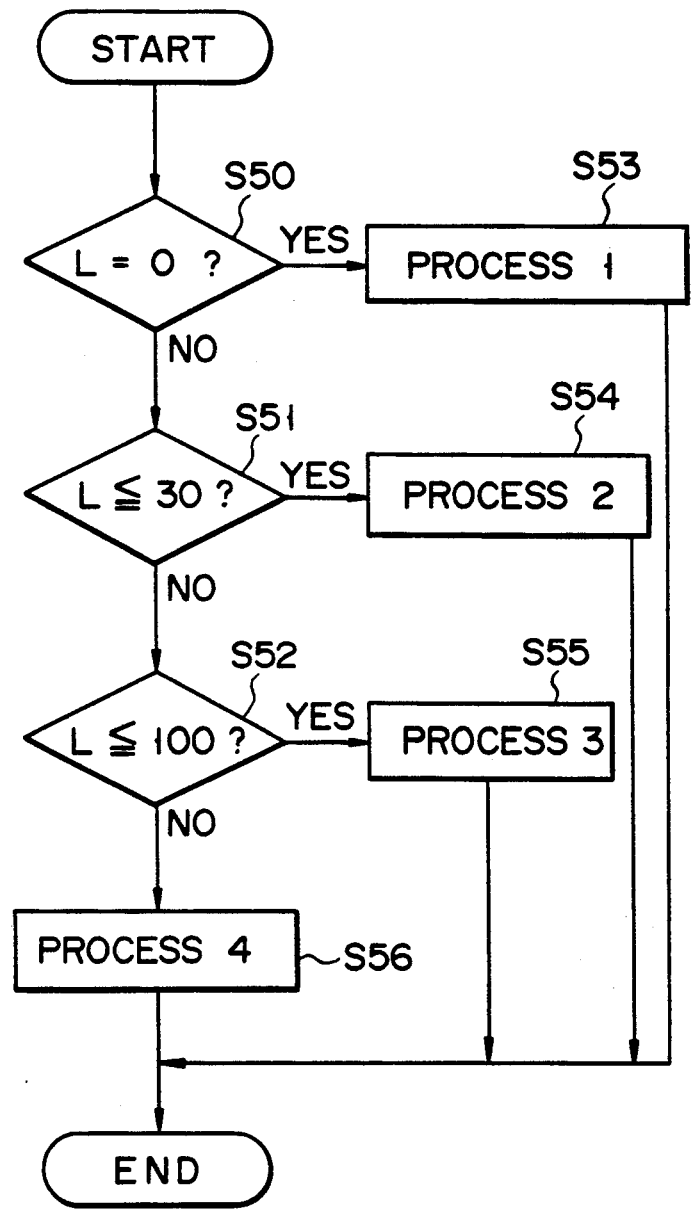
FIG. 7 is a flow chart showing a total decision processing in a system according to a third embodiment of the present invention.

Assume that the number of word speech patterns used in learning of a word reference pattern is represented by L. In the total decision section 41, processing is changed in accordance with the value of L. For example, as shown in FIG. 7, one of four types of processes 1 to 4 (S53 to S56) corresponding to the value of L (determined in S50 to S52) is executed. The four types of processes 1 to 4 will be described below.

[Process 1]
L = 0

No word reference pattern is registered. Word-based matching by the first word recognizing section 20 is not performed, but only phoneme-based matching by the second word recognizing section 30 is performed. A word recognition result by phoneme-based matching is output as a recognition result obtained by the total decision section 41.

[Process 2]
$0 < L \leq 30$ (30 is an example, and this value is not limited to 30 but can be changed as needed)

Word reference patterns are present. However, the word recognition performance by word-based matching has not reached a sufficient level, and the word recognition performance by phoneme-based matching is still more reliable than that by word-based matching. Therefore, a greater importance is given to word recognition by phoneme-based matching in this stage.

Figure 8:
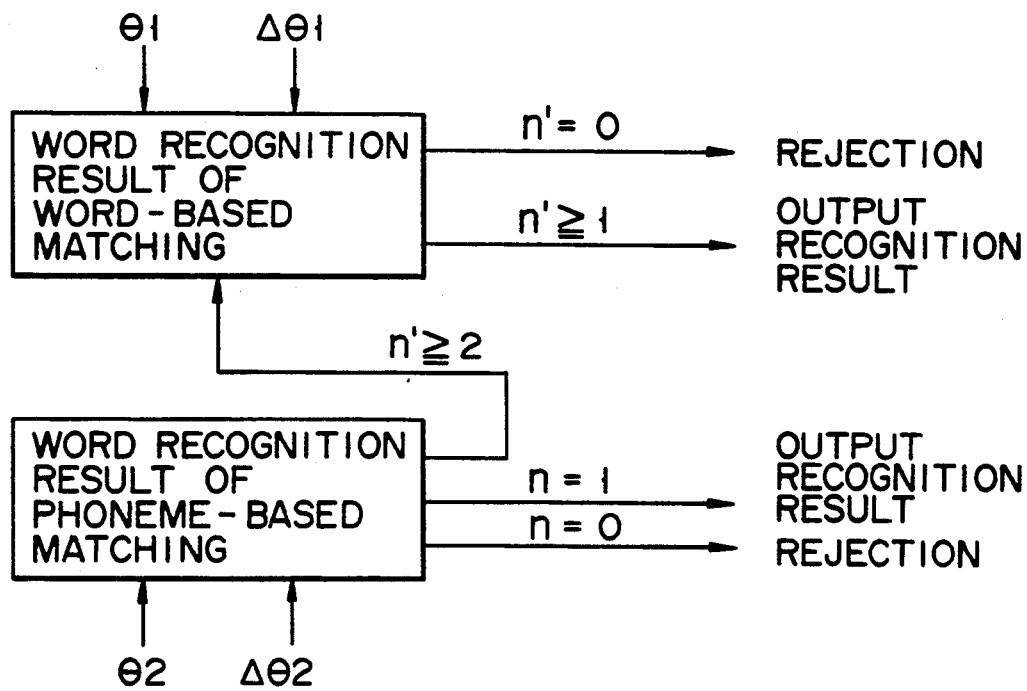

FIG. 8 shows the flow of processing in this case.

Two threshold values ($\theta 2$ and $\Delta \theta 2$) are set for a word recognition result based on phoneme-based matching. In this case, $\theta$ is a threshold for a similarity value obtained by phoneme-based matching and is set as, e.g., $\theta 2 = 0.8$ when the similarity value falls within the range of 0 to 1. In addition, $\Delta \theta 2$ is a threshold value for a difference between a given similarity and a maximum similarity and is set as, e.g., $\Delta \theta 2 = 0.1$. In phoneme-based matching, any category having a similarity value of $\theta 2$ (in this case, 0.8) or more and a similarity difference of $\Delta \theta 2$ (in this case, 0.1) or less becomes a recognition result candidate. If the number of recognition result candidates is n, different processing is performed depending on n=0, n=1, or n≥2.

(i) When n=0, a recognition result with respect to input speech cannot be determined and hence rejection is performed.

(ii) When n=1, a recognition result with respect to input speech is uniquely determined and is directly output as a recognition result without determination using a recognition result of word-based matching.

(iii) When n≥2, since a recognition result cannot be determined by recognition of phoneme-based matching, recognition determination based on word-based matching is performed for recognition result candidates. In word-based matching, threshold values $\theta1$ and $\Delta\theta1$ similar to $\theta2$ and $\Delta\theta2$ are set. If a category having a similarity value of $\theta1$ (e.g., 0.7) or more and a similarity difference of $\Delta\theta1$ (e.g., 0.05) or less is present in the recognition result candidates obtained in word recognition of phoneme-based matching (n'≧1), the corresponding category is output as a recognition result. In this case, if two or more categories satisfying the above condition are present (n'≧2), a category having the greatest similarity value is output as a recognition result. If no category satisfying the above condition is present (n'=0), the candidates are rejected.

In the process 2, a great importance is given to word recognition of phoneme-based matching. That is, after category candidates are selected by using word recognition results based on phoneme-based matching, determination based on word-based recognition is performed. Of recognition results obtained by phoneme-based matching, therefore, categories which are not selected as candidates cannot become recognition results even if similarities of word recognition results by word-based matching reach high levels.

[Process 3]
$30 < L \leq 100$ (The numbers 30 and 100 are examples and can be changed as needed)

The word recognition performance by word-based matching is improved. The performance of word recognition of word-based matching is higher than that of phoneme-based matching. For this reason, processing giving a greater importance to word recognition based on word-based matching is performed in this stage.

Figure 9:
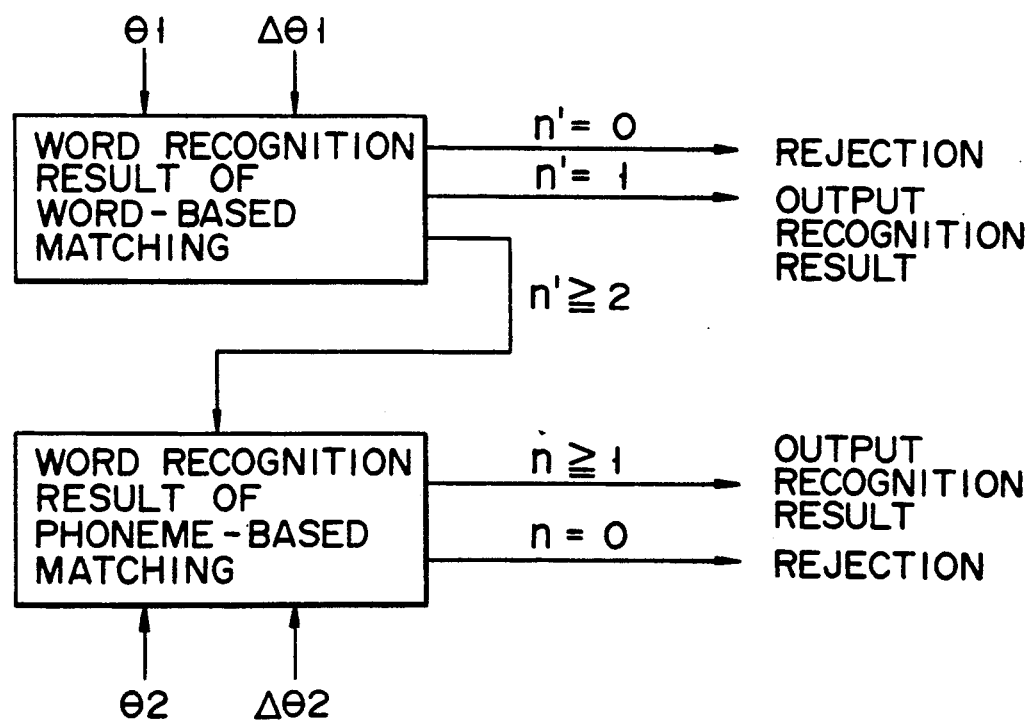

FIG. 9 shows the flow of processing in this case.

Similar to the process 2, two thresholds $\theta1$ and $\Delta\theta1$ are defined with respect to a word recognition result based on word-based matching. In this case, $\theta1$ is a threshold value for a similarity value obtained by word-based matching and is set as, e.g, $\theta1=0.8$ when a similarity falls within the range of 0 to 1. In addition, $\Delta\theta1$ is a threshold value for a difference between a given similarity and a maximum similarity obtained by word-based matching and is set as, e.g., $\Delta\theta1=0.2$. In word-based matching, any category having a similarity of $\theta1$ (in this case, 0.8) or more and a similarity difference of $\Delta\theta1$ (in this case, 0.2) or less is set to be a recognition result candidate. If the number of recognition result candidates is set to be n', different processing is performed depending on n'=0, n'=1, or n'≧2.

(i) When n'=0, a recognition result with respect to input speech cannot be determined and hence rejection is performed.

(ii) When n'=1, a recognition result with respect to input speech is uniquely determined and is directly output as a recognition result without determination using a recognition result of phoneme-based matching.

(iii) When n'≧2, recognition determination of phoneme-based matching is performed with respect to recognition result candidates obtained by word-based matching. In this case, similar to the process 2, threshold values $\theta2$ and $\Delta\theta2$ are set in recognition of phoneme-based matching. If a category having a similarity value of $\theta2$ (e.g., 0.8) or more and a similarity difference of $\Delta\theta2$ (e.g., 0.1) or less is present in the recognition result candidates obtained in word recognition of word-based matching (n≧1), the corresponding category is output as a recognition result. In this case, if two or more categories satisfying the above condition are present (n≧2), a category having the greatest similarity value is output as a recognition result. If no category satisfying the above condition is present (n=0), the candidates are rejected.

In the process 3, since a great importance is given to word recognition of word-based matching, categories which are not selected as candidates by recognition of word-based matching cannot become recognition results even if similarities of word recognition results by phoneme-based matching reach high levels.

[Process 4]
$L > 100$ (The number 100 is an example and can be changed as needed)

In this process, since learning of a word reference pattern has progressed by using sufficient word speech patterns, the performance of word recognition of word-based matching is further improved compared with the process 3, and the performance of word recognition of word-based matching is much higher and more reliable than that of phoneme-based matching. Therefore, processing giving a much greater importance to word recognition of word-based matching is performed.

FIG. 10 shows the flow of processing in this case.

Similar to the processes 2 and 3, two threshold values $\theta1$ and $\Delta\theta1$ are defined with respect to a word recognition result based on word-based matching. In the word-based matching, any category having a similarity value of $\theta1$ (e.g., 0.8) or more and a similarity difference of $\Delta\theta1$ (e.g., 0.1) or less is set to be a recognition result candidate. If the number of recognition result candidates is set to be n', different processing is performed depending on n'=0, n'=1, or n'≧2.

(i) When n'=0, a recognition result with respect to input speech cannot be determined and hence rejection is performed.

(ii) When n'=1, a recognition result with respect to input speech is uniquely determined and is directly output as a recognition result without determination using a recognition result of phoneme-based matching.

(iii) When n'≧2, recognition processing of recognition result candidates obtained by recognition of word-based matching is performed by a transition network using phoneme labels. For example, a transition network shown in, e.g., FIG. 12 (a transition network with respect to a word "HAI (Japanese equivalent for yes)" using phoneme labels representing types of phonemes (e.g., a label for vowels such as [A], [I], [U], [E], and [O] or a label for plosives such as [P], [T], and [K] is prepared with respect to a word to be recognized. With respect to input speech, a phoneme label [H H H H H H A A A A E E I I I] based on phoneme-based matching shown in, e.g., FIG. 11 is generated. If the phoneme label series satisfies a transition network of a category serving as a recognition result candidate, the phoneme label series is output as a recognition result. In this case, if no category satisfying the above transition network is present, rejection is performed. If two or more categories are present, a category having the maximum similarity in word-based recognition is set to be a recognition result.

The types of processes and threshold values are not limited to those shown in the above-described embodiment but can be variously changed. That is, various changes and modifications can be made as long as total decision in which a greater importance is given to recognition of word-based matching with an increased in amount of word speech patterns used in word reference pattern learning is performed.

For example, the total decision section can be designated to automatically perform learning by using 10 word speech patterns for each category when at least 10 word speech patterns used for learning are accumulated for each category to be recognized. In this case, since speech patterns used in recognition processing can be acquired as word speech patterns for word reference pattern learning upon designation of a user, word speech input can be optimally used for learning of word reference patterns.

Word speech input is generally not performed at the same frequency for all the categories in the practical applications of speech recognizers. This becomes a bottleneck in collecting speech patterns and interferes with learning. In order to eliminate such an undesired situation, the number of learning patterns acquired for each category (word) may be counted so as to cause users to utter the word prior to recognition processing with respect to a category for which the count value of learning patterns is small. In addition, in such a case, speech patterns independently acquired by a speech recording apparatus such as a tape recorder may be input to be added to word speech patterns for learning.

Learning processing may be performed upon this designation by using the minimum number of learning patterns in all the categories. For example, if the number of speech patterns is 30 for "ICHI (Japanese equivalent for 1)", 12 for "NI (Japanese equivalent for 2)", and 18 for "SAN (Japanese equivalent for 3)", 12 patterns of the 30 patterns for "ICHI" and 12 patterns of the 18 patterns for "SAN" may be used for learning, and the remaining patterns may be used for the next learning operation. In addition, the minimum number of patterns required for learning may be predetermined.

In the above-described learning operation, for example, the number of word speech patterns used for each category in one learning cycle may be set to be one, or the system may be operated in a mode wherein only word speech pattern acquisition is performed for the category of insufficient learning patterns.

In the above-described embodiment, a phoneme is used as a word constituent element. However, a syllable may be used as a word constituent element. In this case, recognition processing can be performed in the same manner as described above by replacing a phoneme with a syllable.

What is claimed is:

1. A speech recognition system comprising:
   parameter extracting means for analyzing input speech and extracting a speech parameter from the input speech;
   first storage means for storing a word reference pattern;
   first word recognizing means for segmenting the speech parameter extracted by said parameter extracting means into units of words and outputting a word speech pattern corresponding to one of the words, and for performing word recognition by matching the word speech pattern with the word reference pattern stored in said first storage means and outputting a first word-recognition result;
   second storage means for storing at least one word constituent element reference pattern;
   second word recognizing means for segmenting the speech parameter into units of word constituent elements and outputting a word constituent element speech pattern corresponding to one of the word constituent elements, for performing recognition of each of the word constituent elements by matching the word constituent element speech pattern with the word constituent element reference pattern stored in said second storage means and outputting a series of recognized word constituent elements, and for performing word recognition on the basis of the series of recognized word constituent elements and outputting a second word recognition result;
   recognition result output means connected to said first and second word recognizing means, for obtaining a final recognition result from the first and second word recognition results from said first and second word recognizing means, said recognition result output means including means for increasing a value representing a contribution of the first word recognition result to the final recognition result to be larger than a value representing a contribution of the second word recognition result to the final recognition result in accordance with an increase in the number of word speech patterns used in learning for the first recognition and means for determining the final recognition result in accordance with the increasing value representing the contribution of the first word recognition result thereto; and
   learning means for executing learning for forming a new word reference pattern from the recognition result obtained by said recognition result output means and the word speech pattern, said learning means transferring the new word reference pattern to said first storage means, to store it therein and increase the number of word speech patterns being stored in said first storage means.

2. A system according to claim 1, wherein said first word recognizing means includes storage means for storing a word reference pattern, and said learning means includes means for updating a storage content of said storage means.

3. A system according to claim 1, wherein said second word recognizing means uses phonemes as units of a word constituent element.

4. A system according to claim 1, wherein said second word recognizing means uses syllables as units of a word constituent element.

5. A system according to claim 1, wherein said recognizing result output means includes means for weighting the first and second recognition results in accordance with recognition characteristics of said first and second word recognizing means, respectively, and outputting a synthetic recognition result.

6. A system according to claim 1, wherein said learning means includes input means for designating category names of the recognized input speech as learning word speech patterns and means for collecting the learning word speech patterns in response to a designation input from said input means.

7. A system according to claim 1, wherein said learning means includes means for storing non-learned recognition information in said first and second word recognizing means and said recognition result output means, monitor means for monitoring the amount of non-learned recognition information, and means for executing learning on the basis of the recognition information in response to said monitor means every time the amount of non-learned recognition information reaches a predetermined value.

8. A system according to claim 1, wherein said predetermined determination rule is given as:

$$S^{(l)} = \alpha^{(l)} P1^{(l)} + (1-\alpha^{(l)}) P2^{(l)}$$

wherein $S^{(l)}$ is a final similarity value of the category l, $\alpha^{(l)}$ is a parameter representing a contribution of word recognition by word-based matching, and $P1^{(l)}$ and $P2^{(l)}$ are converted similarity values based upon word recognition of word- and phoneme-based matching, respectively.

9. A speech recognition system comprising:
parameter extracting means for analyzing input speech and extracting a speech parameter from the input speech;
first storage means for storing a word reference speech pattern;
first word recognizing means for segmenting the speech parameter extracted by said parameter extracting means into units of words and outputting a word speech pattern corresponding to one of the words, and for performing word recognition by matching the word speech pattern with the word reference pattern stored in said first storage means and outputting a first word-recognition result;
second storage means for storing at least one word constituent element reference pattern;
second word recognizing means for segmenting the speech parameter into units of word constituent elements and outputting a word constituent element speech pattern corresponding to one of the word constituent elements, for performing recognition of each of the word constituent elements by matching the word constituent element speech pattern with the word constituent element reference pattern stored in said second storage means and outputting a series of recognized word constituent elements, and for performing word recognition on the basis of the series of recognized word constituent elements and outputting a second word recognition result;
recognition result output means connected to said first and second word recognizing means, for obtaining a final recognition result from the first and second word recognition results of said first and second word recognizing means; and
learning means for executing learning of the word reference pattern on the basis of the recognition result obtained by said recognition result output means and a word speech pattern extracted in the course of the recognition processing, wherein
said recognition result output means includes means for increasing a value representing a contribution of the first word recognition result to the final recognition result to be larger than a value representing a contribution of the second word recognition result to the final recognition result as the amount of learning executed by said learning means increases and means for determining the final recognition result in accordance with the increasing value representing the contribution of the first word recognition result thereto.

10. A system according to claim 9, wherein said first and second word recognizing means each output discrimination results and said recognition result output means includes means for determining the amount of learning executed by said learning means, and contribution control means for controlling values representing contributions of the first and second recognition results to the final recognition result, so as to increase a relative weight of the discrimination result obtained by said second word recognizing means to the discrimination result obtained by said first word recognizing means as the amount of learning executed increases.

11. A system according to claim 10, wherein said means for determining an amount of learning includes means for discriminating an accumulation value of the number of word speech patterns supplied for learning of said learning means.

12. A system according to claim 10, wherein said contribution control means includes means for controlling priorities of recognition results which are obtained by said first and second word recognizing means so as to obtain a final recognition result.

13. A system according to claim 10, wherein said contribution control means includes means for selecting a processing algorithm from a plurality of processing algorithms having substantially different priorities for recognition results, which are obtained by said first and second word recognizing means so as to obtain a final recognition result, in accordance with a discrimination result obtained by said process discriminating means.

14. A system according to claim 9, wherein said first word recognizing means includes means for storing a word reference pattern and said learning means includes means for updating a storage content of said storage means.

15. A system according to claim 9, wherein said word constituent elements comprise phonemes.

16. A system according to claim 9, wherein said word constituent elements comprise syllables.

17. A system according to claim 9, wherein said recognition result output means includes means for obtaining a recognition result by weighting the first and second recognition results obtained by said first and second word recognizing means in accordance with recognition characteristics of said first and second word recognizing means, respectively.

18. A system according to claim 9, wherein said learning means includes input means for designation a category name of the recognized input speech as a learning word speech pattern and means for collecting of the word speech patterns in response to a designation input from said input means.

19. A system according to claim 9, wherein said learning means includes means for storing recognition information in said first and second word recognizing means and said recognition result output means, counting means for counting an accumulation value of the number of word speech patterns subjected to recognition processing, and said means for executing learning executes learning on the basis of the recognition information in response to said counting means every time the accumulation value reaches a predetermined value.

20. A speech recognition system comprising:
parameter extracting means for analyzing input speech and extracting speech parameter from the input speech;
first reference pattern output means for outputting a word reference pattern;
first word recognizing means for segmenting the speech parameter extracted by said parameter extracting means into units of words and outputting a word speech pattern corresponding to one of the words, and for performing word recognition by matching the word speech pattern with the word reference pattern output from said first reference pattern output means and outputting a first word-recognition result;

second reference pattern output means for outputting a word constituent element reference pattern;

second word recognizing means for segmenting the speech parameter into units of word constituent elements, for outputting a word constituent element speech pattern corresponding to one of the word constituent elements, for performing recognition of each of the word constituent elements by matching the word constituent element speech pattern with the word constituent element reference pattern output from said second reference pattern output means to obtain a series of recognized word constituent elements, and for performing word recognition on the basis of a series of recognized word constituent elements and outputting a second word recognition result;

recognition result output means connected to said first and second word recognizing means, for obtaining a final recognition result from the first and second word recognition results from said first and second word recognizing means, said recognition result output means including means for increasing a value representing a contribution of the first word recognition result to the final recognition result to be larger than a value representing a contribution of the second word recognition result to the final recognition result as the number of word speech pattern used in learning for the first word recognition increases and means for determining the final recognition result in accordance with the increasing value representing the contribution of the first word recognition result thereto; and learning means for executing learning for forming a new word reference pattern from the final recognition result obtained by said recognition result output means and the word speech pattern, thereby increasing the number of word reference patterns.

* * * * *